(12) United States Patent
Joy et al.

(10) Patent No.: US 10,148,684 B2
(45) Date of Patent: Dec. 4, 2018

(54) METHOD AND SYSTEM FOR PLACING A WORKLOAD ON ONE OF A PLURALITY OF HOSTS

(71) Applicant: ORACLE INTERNATIONAL CORPORATION, Redwood Shores, CA (US)

(72) Inventors: Ajai Joy, Tyngsboro, MA (US); Sarat C. Aramandla, Arlington, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 15/417,645

(22) Filed: Jan. 27, 2017

(65) Prior Publication Data

US 2018/0219899 A1   Aug. 2, 2018

(51) Int. Cl.
| | |
|---|---|
| H04L 29/06 | (2006.01) |
| G06F 11/30 | (2006.01) |
| G06F 11/34 | (2006.01) |
| G06F 9/455 | (2018.01) |

(52) U.S. Cl.
CPC ...... *H04L 63/1433* (2013.01); *G06F 9/45533* (2013.01); *G06F 11/301* (2013.01); *G06F 11/3006* (2013.01); *G06F 11/3433* (2013.01)

(58) Field of Classification Search
CPC ............. H04L 63/1433; G06F 9/45533; G06F 11/3433
USPC .......................................................... 726/25
See application file for complete search history.

(56) References Cited

U.S. PATENT DOCUMENTS

| | | | | |
|---|---|---|---|---|
| 8,966,623 | B2 * | 2/2015 | Horovitz | G06F 9/45533 726/22 |
| 2011/0219447 | A1 * | 9/2011 | Horovitz | G06F 9/45533 726/22 |
| 2015/0278219 | A1 * | 10/2015 | Phipps | G06Q 10/0637 707/711 |
| 2016/0266891 | A1 * | 9/2016 | Phipps | G06Q 10/0637 |

* cited by examiner

*Primary Examiner* — Teshome Hailu
(74) *Attorney, Agent, or Firm* — Kraguljac Law Group LLC

(57) ABSTRACT

Systems, methods, and other embodiments associated with placing a workload on one of a plurality of hosts are described. In one embodiment, a method includes analyzing hosts to identify a first host and a second host determined to meet resource requirements of the workload. The example method may also include analyzing the first host to calculate a first threat score, and analyzing the second host to calculate a second threat score. The example method may also include selecting a host with a lowest threat score and placing the workload on the selected host. The example method may also include reanalyzing the selected host to calculate an updated threat score. The example method may also include in response to determining that the updated threat score exceeds a threshold threat score, moving the workload to a third host.

20 Claims, 8 Drawing Sheets

| | | 130 |
|---|---|---|
| | DATA CENTER MAP DATA STRUCTURE | |

| HOST (305) | OS (310) | CPU (315) | STORAGE (320) | THREAT SCORE (325) |
|---|---|---|---|---|
| HOST 141 | OS1-V1 | BRAND1 2.2GHZ | 15 TB | 80 |
| HOST 142 | OS2-V1 | BRAND2 2.0GHZ | 20 TB | 90 |
| HOST 143 | OS2-V3 | BRAND1 2.1GHZ | 18 TB | 95 |
| HOST 144 | OS1-V2 | BRAND3 1.8GHZ | 13 TB | 90 |
| HOST (5) | OS3-V5 | BRAND1 1.7GHZ | 4 TB | ? |

VULNERABILITY DATA STRUCTURE — 155

| VULNERABILITY (405) | VULNERABILITY CLASS (410) | DATE (415) | VENDOR (420) | UPDATES (425) |
|---|---|---|---|---|
| VULNERABILITY (1) | INFORMATION LEAK | 05/02/06 | VENDOR (1) | N/A |
| VULNERABILITY (2) | DOS-MALFORM | 08/09/13 | VENDOR (2) | N/A |
| VULNERABILITY (3) | INJECTION | 01/25/10 | VENDOR (3) | PATCH RELEASED |
| VULNERABILITY (4) | BUFFER OVERFLOW | 10/23/15 | VENDOR (4) | SPREADS |
| VULNERABILITY (5) | FORGERY | 01/13/16 | VENDOR (5) | FROM USB |

METHOD AND SYSTEM FOR PLACING A WORKLOAD ON ONE OF A PLURALITY OF HOSTS

BACKGROUND

A public cloud vendor may offer various servers for rent. The servers are used to host different forms of data including services being provided by various clients. When a request to host a service on a server is received by the public cloud vendor from a client, the public cloud vendor determines which of the servers to use to host the service for the client. The server may provide storage space upon which the service is stored, and a connection to a network, such as the Internet, through which the service communicates with one or more users of the service. Other physical resources provided by the server to the service include processing power, random access memory (RAM), and bandwidth through the connection to the network. The server may host the service concurrently with one or more other services. Resources of the server are finite, and thus, while the resources are being used by the service, the resources are not available to be used by the other services hosted by the server.

In order to improve performance of the services hosted by the servers, and optimize the distributed use of network bandwidth, processing and storage sources, and/or overall system load across the servers, it is desirable to efficiently select servers for hosting services.

Unfortunately, typical existing public cloud vendors are limited to selecting servers using resource-related criteria, without taking into account other relevant criteria. Thus, services and servers alike are limited in their level of performance.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

FIG. 3 illustrates an embodiment of a data center map data structure.

FIG. 4 illustrates an embodiment of a vulnerability data structure.

DETAILED DESCRIPTION

Figure 1:
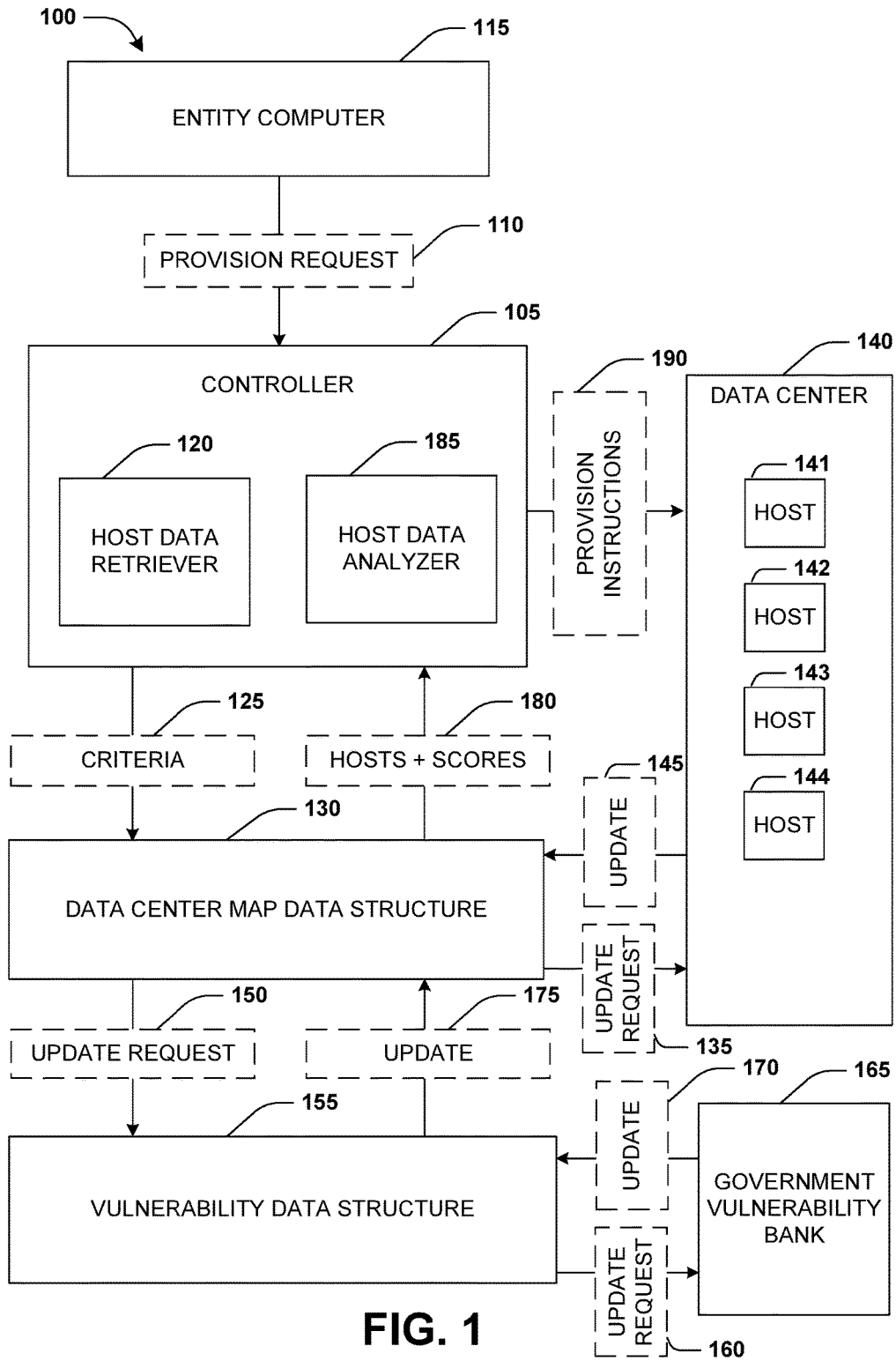
FIG. 1 illustrates an embodiment of a system associated with placing a workload on one of a plurality of hosts.

Computerized systems and methods are described herein that provide for placing a workload, such as a virtual machine or a software container, on one of a plurality of hosts. In one embodiment, a plurality of hosts are maintained by a manager, such as a public cloud vendor. The plurality of hosts have various resources and thus various capabilities. The resources that vary between hosts include hardware resources, such as storage space, processing power, RAM, and bandwidth, as well as software resources, such as operating systems and relational database management systems (RDBMS).

When a client attempts to have the system provision a host for a workload of the client, the client provides information about a service of the workload or other function associated with the workload. The system tries to identify a host suitable for hosting the workload from amongst the plurality of hosts based upon a determination that resources of the host are sufficient to meet requirements of the workload. However, there is typically more than one host with resources sufficient to meet the requirements of the workload, and the resources of the hosts alone do not provide a complete picture of the adequacy of a host for the workload. For example, one host has sufficient hardware resources to support the workload, but is not sufficiently secure for the needs of the workload. Thus, in order to select a host from the multiple hosts with sufficient resources, security-related criteria may need to be considered.

In one embodiment, the plurality of hosts are initially filtered based upon preliminary criteria, such as whether each host meets resource requirements of the workload. Hosts that do not meet the preliminary criteria are removed as candidates. Placement scores are calculated for each of the remaining hosts. The remaining hosts are then more closely examined to identify a host that has an optimal placement score, and the workload is placed on the host with the optimal placement score. In one embodiment, the optimal placement score is a highest placement score, while in another embodiment, the optimal placement score is a lowest placement score. In one embodiment, after the workload has been placed on the host, a new/updated placement score is calculated for the host. If the new placement score is determined to be too high (exceeds a threshold value) or too low (falls below a threshold value), the workload is moved to a different host. If the host is running multiple workloads, then in one embodiment, one or more of the other workloads may be moved to a different host to lower the new placement score. In one embodiment, each placement score for a host is calculated based upon one or more scores calculated for the host. Each of the one or more scores for the host is a quantifiable resource (measurement) indicative of a degree (level) of applicability of one or more parameters to the host. In one embodiment, each placement score for a host is a threat score for the host. In one embodiment, each placement score for a host is calculated based upon a combination of a threat score for the host and one or more other scores for the host.

With reference to FIG. 1, one embodiment of a system 100 associated with placing a workload on a selected host of a plurality of hosts is illustrated. The system 100 includes a controller 105, which may be configured to execute on a computer. The controller 105 may be initiated based upon a provision request 110 being received from an entity computer 115, such as a computer of a client that is requesting a host to be provisioned for a workload of the client. For example, the workload may include a virtual machine or a software container, and may run an email service. The controller 105 may receive the provision request 110 over a network connection. A host data retriever 120 is configured to analyze the provision request 110 and identify data within that identifies information about the workload, resources required by the workload and associated parameters of the workload. The provision request 110 may specify a level of security required for the workload or information about the type of service the workload will provide. In some examples, the level of security required for the workload is predicted based upon a combination of one or more factors such as the type of service the workload will provide, a location or identity of the entity computer 115, or other information included in the provision request 110. For example, a workload hosting a proxy server requires a first level of security, a workload hosting a derivative server requires a second level of security, and a workload hosting a service that processes sensitive information, such as credit card data, requires a third level of security.

The controller 105 utilizes the host data retriever 120 to generate criteria 125 for hosts to be considered for the provision request 110. The criteria 125 may specify information about the type of service the workload will provide, storage space required for the workload, processing power required by the workload, and an operating system within which the workload is configured to operate. For example, the criteria 125 specifies that the workload will provide an email service, and that the workload will require 4 terabytes of storage space. Policies that are either specified in the provision request 110 or predicted based upon the level of security required or the type of service of the workload may also be included in the criteria 125. The policies represent hard requirements of the client for hosting the workload. For example, the policies specify geographical limits to where the workload may be hosted. For example, the criteria 125 specifies "NATO members" as acceptable geographical locations within which the workload is to be hosted, in accordance with a need of the client to keep the workload within an area determined to be outside the reach of adversaries. Alternatively, the policies may specify legal requirements to which the workload is to adhere. For example, the criteria 125 specifies that communications sent by the host of the workload are required to meet certain standards, and that the host of the workload is to reject communication with one or more designated entities.

The criteria 125 is used to analyze a data center map data structure 130 in order to identify hosts to be considered for the provision request 110. The controller 105 uses the data center map data structure 130 to generate an update request 135 for information about hosts in a data center 140. The data center 140 includes a plurality of host devices that are connected to and managed by the data center 140. The hosts are illustrated as, for example, a first host 141, a second host 142, a third host 143 and a fourth host 144. Any number of host devices may be part the data center 140. Each host in the data center 140 may run a native or hosted hypervisor, which may run one or more workloads.

To determine which host to select for the provision request 110, the data center 140 analyzes the hosts. For example, the data center 140 scans the hosts and generates an update 145 of a current state of the hosts. For example, the update 145 may specify which hosts are currently managed by the data center 140, which hosts were recently removed from the data center 140, which hosts are expected to join the data center 140 within a threshold period of time, which hosts are expected to go offline within a threshold period of time, as well as capabilities and resources of the respective hosts. The update 145 is used by the controller 105 to generate a map of the hosts of the data center 140, and the map may be stored in the data center map data structure 130. The controller 105 may then use the map to track a variety of properties for each host in the map, for example, the status of each host of the data center 140, a hardware profile of each host, a software profile of each host, and other information associated with each host. The status, the hardware profile, and the software profile are determined based upon the scanning of the respective hosts. The other information is determined by scanning computers determined to be connected to the respective hosts. In an example, the update request 135 is generated, and the update 145 is received, in response to receiving the criteria 125. In another example, the update request 135 is generated, and the update 145 is received, periodically.

The controller 105 uses the data center map data structure 130 to generate an update request 150 for information about vulnerabilities identified in a vulnerability data structure 155. A vulnerability may be a security-related weakness, susceptibility or flaw in a system that, if exploited by an attacker, will reduce an information assurance of a host, violate a security policy of the system, provide the attacker with unauthorized access to information in the system and/or disrupt processes of the system. The update request 150 may specify one or more hosts of the data center 140. For example, information about hosts of the data center 140 determined to comply with the criteria 125 are requested in the update request 150, in an attempt to gather information in response to the provision request 110. In another example, information about all active hosts of the data center 140 are requested in the update request 150, in accordance with an effort to maintain accurate vulnerability information about the hosts of the data center 140 as part of the map of the hosts of the data center 140 at the data center map data structure 130.

In one embodiment, various features of the hosts of the data center 140 are continuously monitored, including network traffic and load associated with the respective hosts, and the map of the hosts of the data center 140 is continuously updated based upon new information derived by the monitoring.

The controller 105 uses the vulnerability data structure 155 to generate an update request 160 for information about vulnerabilities documented in a government vulnerability bank 165. The government vulnerability bank 165 may include the Common Vulnerabilities and Exposures (CVE) system maintained by the National Cybersecurity Federally Funded Research and Development Center (FFRDC), the National Vulnerability Database, or any other similar source identifying vulnerabilities. The government vulnerability bank 165 analyzes one or more databases of documented vulnerabilities and generates an update 170 of vulnerabilities for the vulnerability data structure 155. For example, the update 170 may specify which vulnerabilities were documented after a last update request from the vulnerability data structure 155, or which vulnerabilities are determined to not be listed in the vulnerability data structure 155. In another example, the update 170 may specify all vulnerabilities documented in the government vulnerability bank 165. In another example, the update 170 may specify vulnerabilities identified based upon one or more criteria included in the update request 160. In an example, the update request 160 is generated, and the update 170 is received, in response to receiving the criteria 125. In another example, the update request 160 is generated, and the update 170 is received, periodically. The update 170 may be retrieved from the government vulnerability bank 165 using an application program interface (API), or via a data feed, such as a Really Simple Syndication (RSS) feed.

In one embodiment, the government vulnerability bank 165 is selected (for use as described herein) from a set of candidate vulnerability banks based upon the policies or a geographical location associated with the workload. For example, the government vulnerability bank 165 is selected if a determination is made that the workload is to serve users in the United States, while a European Union government vulnerability bank is selected if a determination is made that the workload is to serve users in Italy.

The controller 105 uses the vulnerability data structure 155 to analyze one or more vulnerabilities and generates an update 175 of vulnerabilities for the data center map data structure 130. The update 175 may specify vulnerabilities applicable to the one or more hosts in the data center 140, which may be determined based upon the hardware profiles or the software profiles of the respective hosts. For example, vulnerabilities applicable to hosts of the data center 140 determined to comply with the criteria 125 are included in the update 175, in an attempt to provide information in response to the provision request 110. In another example, information about all active hosts of the data center 140 are provided in the update 175 (e.g., periodically), in accordance with an effort to (continuously) maintain accurate vulnerability information about the hosts of the data center 140 as part of the map of the hosts of the data center 140 at the data center map data structure 130. The vulnerabilities applicable to each host represented in the map are used to calculate a threat score for the host. A threat is a potential danger capable of exploiting the vulnerabilities applicable to the host, and may be intentional, such as a hacker, or accidental, such as a computer malfunction or a natural disaster. Each threat score is a quantifiable resource (measurement) indicative of a degree (level) of vulnerability of the corresponding host to one or more threats. An algorithm may be used to calculate each threat score, and may be dynamically updated based upon feedback received from the data center 140 or from third party sources.

The criteria 125 is used to analyze the data center map data structure 130 in order to identify hosts and scores 180. In an example, the criteria 125 includes a hashmap that stores data in a plurality of bins. The hosts and scores 180 include a set of candidate hosts of the data center 140 that comply with the criteria 125, and their corresponding threat scores. For example, hosts in the data center 140 that have at least 4 terabytes of storage space and have sufficient bandwidth to support the email service of the workload may be identified in the data center map data structure 130 for inclusion, along with their corresponding threat scores, in the hosts and scores 180.

The controller 105 utilizes the host data analyzer 185 to analyze the hosts and scores 180 for the identification of hosts that can satisfy the provision request 110. The hosts and scores 180 may each be considered to identify hosts with threat scores that comply with the level of security required for the workload. In an example, the host within the hosts and scores 180 that is determined to have the lowest threat score is selected. In another example, two or more hosts within the hosts and scores 180 that are determined to have sufficiently low threat scores may be identified, and a host may be selected from the two or more hosts based upon one or more preferences of the client. The preferences represent soft requirements of the client for hosting the workload. For example, if the first host 141 and the fourth host 144 are determined to have threat scores below a threshold threat score corresponding to the level of security required for the workload, the first host 141 is selected over the fourth host 144 in response to determining that the first host 141 is associated with less power use or a smaller carbon footprint than the fourth host 144.

The controller 105 generates provision instructions 190 to provide to the data center 140. The provision instructions 190 may provide for the workload to be provisioned to the host in the data center 140 selected by the host data analyzer 185. For example, the provision instructions 190 may provide for the first host 141 to host the workload, but may not provide for the second host 142 to host the workload.

In one embodiment, the system 100 is a computing/data processing system including an application or collection of distributed applications for enterprise organizations. The applications and system 100 may be configured to operate with or be implemented as a cloud-based networking system, a software as a service (SaaS) architecture, or other type of networked computing solution. In one embodiment the system 100 is a centralized server-side application that provides at least the functions disclosed herein and that is accessed by many users via computing devices/terminals communicating with the system 100 (functioning as the server) over a computer network. The cloud-based networking system may include a public cloud, a private cloud, or a hybrid cloud.

Figure 2:
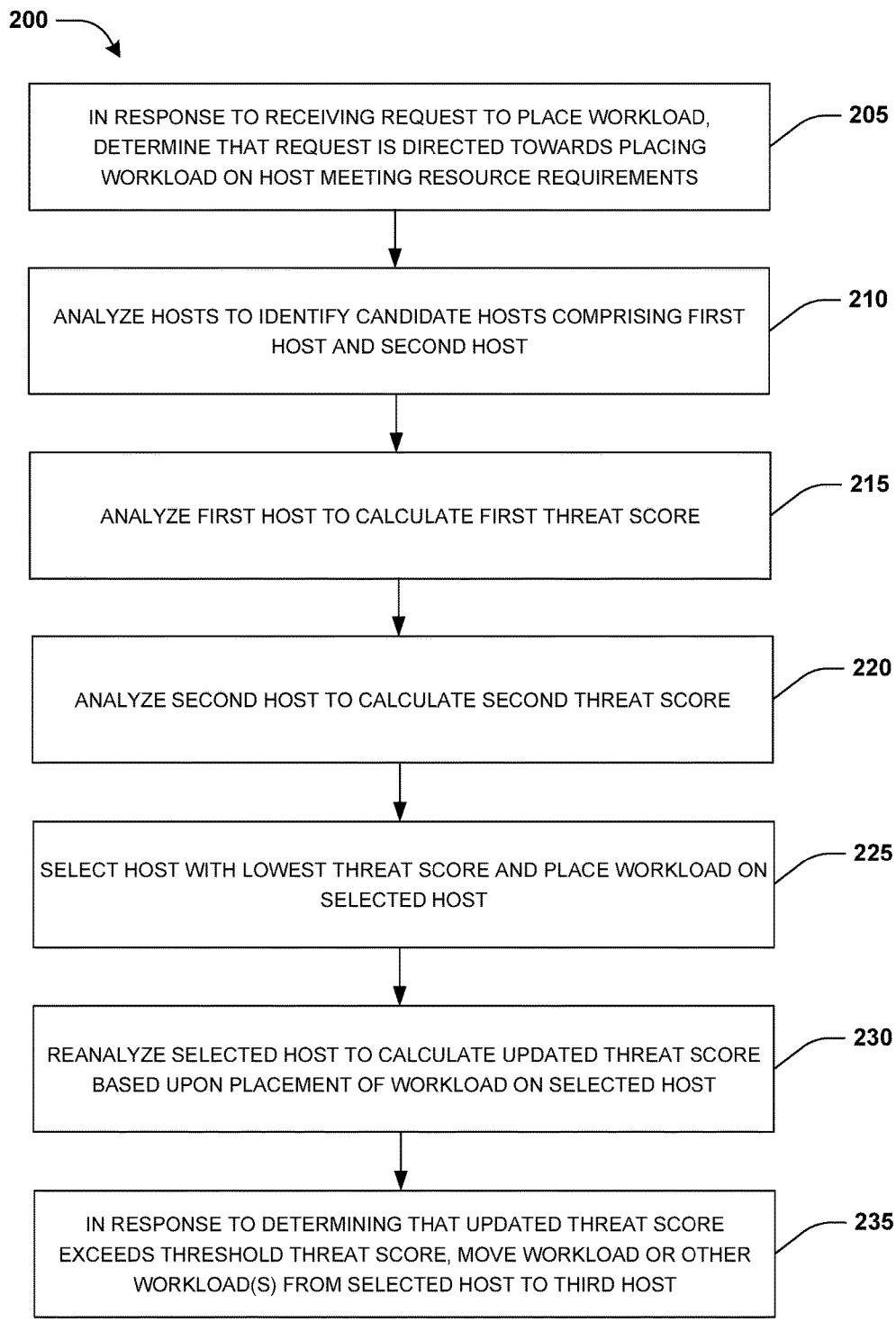
FIG. 2 illustrates an embodiment of a method associated with placing the workload on one of the plurality of hosts.

FIG. 2 illustrates one embodiment of a computer-implemented method 200 associated with selecting a host for a workload, such as a virtual machine or a software container, and placing the workload on the selected host, where a plurality of hosts are available for hosting. In one embodiment, method 200 is performed by the controller 105 utilizing various computing resources of the computer 805 (shown in FIG. 8), such as the processor 810 for executing instructions, memory 815 and/or disks 830 for storing data structures within which control instructions are generated, and/or network hardware for transmitting data structures to remote computers over networks. The method 200 may be triggered based upon various triggers, such as receipt of the provision request 110 from the entity computer 115, etc.

At 205, in response to receiving the provision request 110 to place a workload on one of a plurality of hosts, a determination is made that the provision request 110 is directed towards placing the workload on a host that meets one or more resource requirements. For example, information in the provision request 110 is analyzed to identify specified resource requirements. For example, a portion of the provision request 110 may indicate that 15 TB of storage space and a 2.0 GHz processor are required. In another example, information in the provision request 110 is analyzed to identify information about one or more functions of the workload and to predict resource requirements based upon the one or more functions. For example, a portion of the provision request 110 may indicate that the workload will include a video sharing service, and a prediction may be made that the video sharing service will require between 13 TB and 17 TB of storage space and between a 1.8 GHz and 2.2 GHz processor.

At 210, the plurality of hosts are analyzed to identify a set of candidate hosts determined to meet the one or more resource requirements determined from the provision request 110. The analyzing may include analyzing the data center map data structure 130 corresponding to the data center 140 to identify the candidate hosts. One embodiment of the data center map data structure 130 is illustrated in FIG. 3 and includes indications of a plurality of hosts 305 and a plurality of software 310, processors 315, storage space 320 and threat scores 325 associated with one or more of the plurality of hosts 305. For example, the first host 141 may be determined to have 15 TB of storage space and a 2.2 GHz processor and thus be in compliance with the resource requirements of the provision request 110, and may thus be included in the candidate hosts. The second host 142 may be determined to have 20 TB of storage space and a 2.0 GHz processor and thus be in compliance with the resource requirements of the provision request 110, and may thus be included in the candidate hosts.

At 215, the first host 141 is analyzed to calculate a first threat score for the first host 141. The analyzing the first host 141 may include analyzing the vulnerability data structure 155 to identify one or more vulnerabilities that the first host 141 is determined to have (or to be at risk of exposure to), and using those vulnerabilities to calculate the first threat score. FIG. 4 illustrates one embodiment of the vulnerability data structure 155 that includes, for example, indications of a plurality of vulnerabilities 405 and a plurality of vulnerability classes 410, dates 415, vendors 420 and updates 425 associated with one or more of the plurality of vulnerabilities 405. For example, a determination is made that the first host 141 runs a second workload with software from a product of a first vendor determined to have a first vulnerability of a first vulnerability class, and the first threat score is calculated based upon the first vulnerability. The first threat score is stored in the data center map data structure 130 in association with the first host 141.

At 220, the second host 142 is analyzed to calculate a second threat score for the second host 142. The analyzing the second host 142 may include analyzing the vulnerability data structure 155 to identify one or more vulnerabilities that the second host 142 is determined to have (or to be at risk of exposure to), and using those vulnerabilities to calculate the second threat score. For example, a determination may be made that the second host 142 runs a third workload with software from a product of a second vendor determined to have a second vulnerability of a second vulnerability class, and another workload with software from a product of a third vendor determined to have a third vulnerability of a third vulnerability class. The second threat score may be calculated based upon the second vulnerability and the third vulnerability. The second threat score is stored in the data center map data structure 130 in association with the second host 142. This process is repeated for any additional candidate hosts and a threat score is calculated for each host.

In one embodiment, each threat score may be weighted based upon costs corresponding to the respective hosts. For example, the calculation of the first threat score for the first host 141 can include initially calculating a first raw threat score for the first host 141 based upon the one or more vulnerabilities of the first host 141, and then determining a first weight corresponding to a first cost of moving the workload from the first host 141 to another (fourth) host (144). The first cost may be an amount of resources or fees predicted to be required in the event that the workload needs to be moved from the first host 141 to a different host in the future. For example, the first cost of moving the workload from the first host 141 to the fourth host 144 is determined to be 2 hours of processing power. The first threat score is calculated by applying the first weight associated with the first cost to the first raw threat score.

The calculation of the second threat score for the second host 142 can include initially calculating a second raw threat score for the second host 142 based upon the one or more vulnerabilities of the second host 142, and then determining a second weight corresponding to a second cost of moving the workload from the second host 142 to another (fourth) host (144). The second cost may be an amount of resources or fees predicted to be required in the event that the workload needs to be moved from the second host 142 to a different host in the future. For example, the second cost of moving the workload from the second host 142 to the fourth host 144 is determined to be 4 hours of processing power. The second threat score is calculated by applying the second weight associated with the second cost to the second raw threat score.

At 225, the threat scores for the hosts are compared to identify the host with the lowest threat score or minimum threat score. The host with the lowest threat score is selected for hosting the workload at day-0. For example, in response to determining that the first threat score of the first host 141 is less than the second threat score of the second host 142, the first host 141 is selected, and the workload is placed on the first host 141. For example, the first threat score is reflective of merely the first vulnerability of the first host 141, and is thus be calculated to be 80, while the second threat score is reflective of both the second vulnerability and the third vulnerability of the second host 142, and is thus be calculated to be 90. In the example, the first threat score of 80 is determined to be less than the second threat score of 90, and the first host 141 is selected over the second host 142. The placement of the workload on the first host 141 may include sending the provision instructions 190 to the data center 140, or directly to the first host 141.

Figure 5:
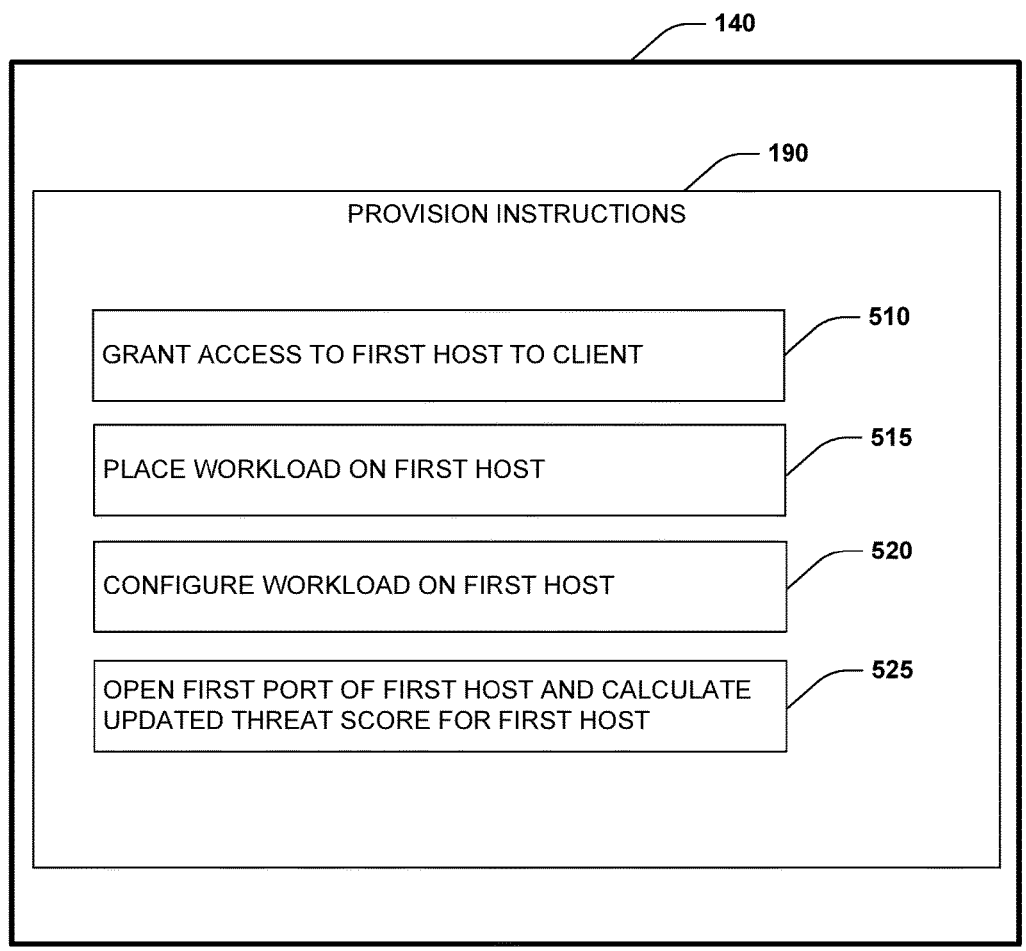
FIG. 5 illustrates an embodiment of a data center with provision instructions.

One embodiment of the provision instructions 190 is shown in FIG. 5, as a data structure received by the data center 140. The provision instructions 190 include a first instruction 510 to grant access to the first host 141 to the entity computer 115, a second instruction 515 to place the workload on the first host 141, a third instruction 520 to configure the workload (such as by installing (specified) software and settings) on the first host 141 (to support one or more needs of the workload), and a fourth instruction 525 to open a first communication port of the first host 141 (to meet a communication need of the workload) and calculate an updated threat score for the first host 141.

At 230, the selected host (the first host 141) is reanalyzed to calculate the updated threat score at day-2. In one embodiment, a period of time passes between selecting the host with the lowest threat score for hosting the workload at day-0 and calculating the updated threat score at day-2. For example, the period of time is a number of nanoseconds, milliseconds, seconds, minutes, hours, days, etc. In one embodiment, an event occurring on the selected host triggers the calculating the updated threat score. For example, the updated threat score is calculated in response to installation of an update, a patch, or a new binary/software, a reconfiguration of an existing binary/software, or the execution of one or more workloads. The updated threat score is based upon the placement of the workload on the first host 141. For example, the updated threat score accounts for the operation of the workload on the first host 141, an impact of the workload on a configuration of the first host 141 or on other workloads on the first host 141, etc. The reanalyzing the first host 141 may include analyzing the vulnerability data structure 155 to identify one or more vulnerabilities that the first host 141 is determined to have (or to be at risk of exposure to) in light of the inclusion of the workload in the first host 141, and using those vulnerabilities to calculate the updated threat score. For example, a determination is made that the first host 141 runs the workload which is determined to have a new vulnerability, in addition to the second workload with software from the product of the first vendor determined to have the first vulnerability. In the example, the updated threat score is calculated based upon the new vulnerability and the first vulnerability. In another example, the updated threat score may be calculated based upon a determination that the first host 141 opened one port to accommodate the workload. The updated threat score is stored in the data center map data structure 130 in association with the first host 141.

In one embodiment, one or more actions performed by the workload are monitored. The reanalyzing the selected host (the first host 141) is performed in response to determining that at least one of the actions are associated with a likelihood of increasing vulnerability, or in response to detecting an anomaly.

At 235, in response to determining that the updated threat score of the selected host (the first host 141) exceeds a threshold threat score, the workload or one or more other workloads are moved from the selected host (the first host 141) to the third host 143. In an example, the third host 143 is determined to meet resource requirements and security requirements of the workload (or the one or more other workloads) prior to the move. For example, the updated threat score is reflective of both the new vulnerability and the first vulnerability, and is thus be calculated to be 106. In the example, the threshold threat score is determined based upon one or more requirements of the client specified in the provision request 110. In another example, the threshold threat score is determined based upon requirements of the first host 141, or requirements of the data center 140. The moving of the workload from the first host 141 to the third host 143 may include sending move instructions that are a variation of the provision instructions 190 to the data center 140, directly to the first host 141, or directly to the third host 143.

It may be appreciated that the reanalyzing of block 230 and the moving of block 235 may be repeated periodically for the workload, whether the workload is placed on the first host 141 or another host.

Figure 6:
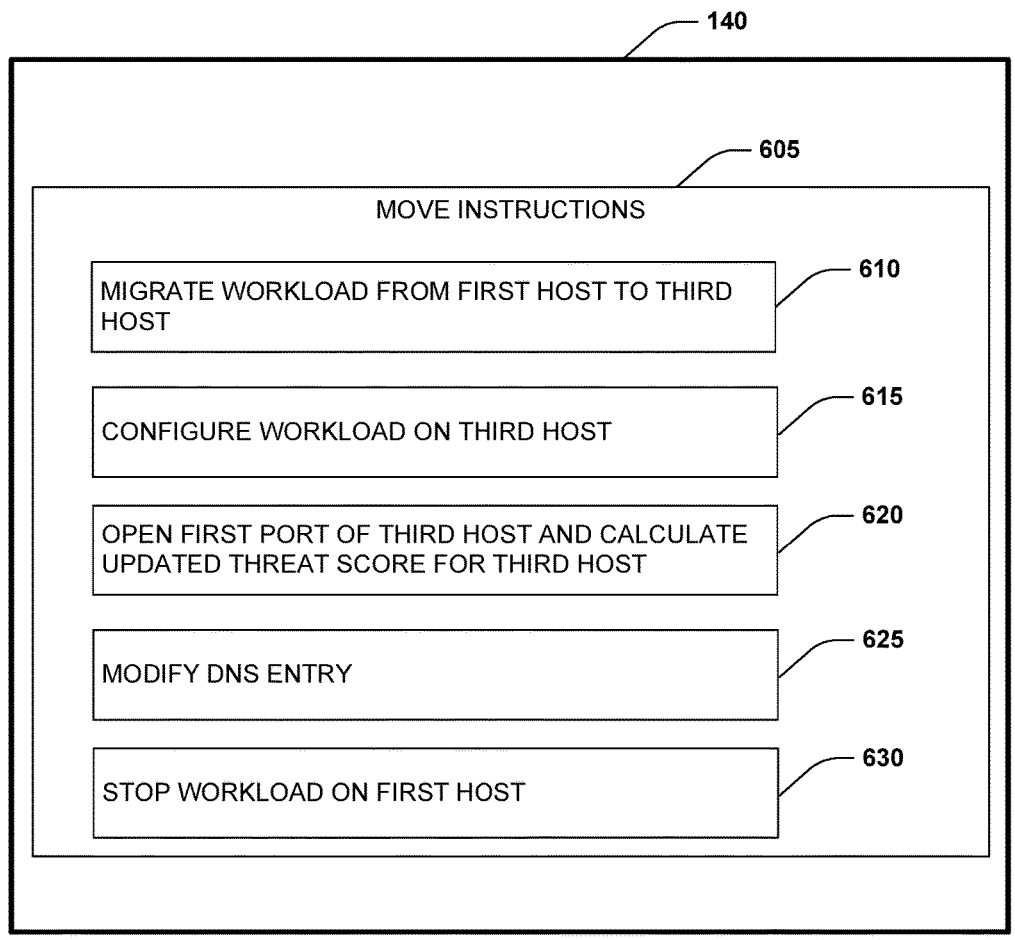
FIG. 6 illustrates an embodiment of the data center with move instructions.

One embodiment of the move instructions 605 is shown in FIG. 6, as a data structure received by the data center 140. The move instructions 605 include a first instruction 610 to migrate the workload from the first host 141 to the third host 143, a second instruction 615 to configure the workload (such as by installing (specified) software and settings) on the third host 143 (to support one or more needs of the workload), a third instruction 620 to open a first communication port of the third host 143 (to meet a communication need of the workload) and calculate an updated threat score for the third host 143, a fourth instruction 625 to modify a Domain Name System (DNS) entry to indicate the transfer of the workload from the first host 141 to the third host 143, and a fifth instruction 630 to stop (or kill) the copy of the workload on the first host 141.

In one embodiment, the workload or the one or more other workloads are selected for movement from the first host 141 to the third host 143 based upon costs associated with the respective workloads. A first cost of moving the workload from the first host 141 to the third host 143 is calculated. The first cost may be an amount of resources or fees predicted to be required to move the workload to the third host 143. For example, the first cost of moving the workload from the first host 141 to the third host 143 is determined to be 1 hour of processing power. A second cost of moving the one or more other workloads from the second host 142 to the third host 143 is calculated. The second cost may be an amount of resources or fees predicted to be required to move the one or more other workloads to the third host. For example, the second cost of moving the one or more other workloads from the second host 142 to the third host 143 is determined to be 3 hours of processing power.

The first cost is compared to the second cost to determine whether to select the workload or the one or more other workloads for movement from the first host 141 to the third host 143. If a determination is made that the first cost of moving the workload from the first host 141 to the third host 143 is less than the second cost of moving the one or more other workloads from the first host 141 to the third host 143, the workload is selected to be moved (instead of the one or more other workloads). If, instead, a determination is made that the first cost of moving the workload from the first host 141 to the third host 143 is greater than the second cost of moving the one or more other workloads from the first host 141 to the third host 143, the one or more other workloads are selected to be moved (instead of the workload).

In one embodiment, the workload or the one or more other workloads are selected for movement from the first host 141 to the third host 143 based upon an association with the increase from the first threat score to the updated threat score. The respective workloads on the first host 141 are analyzed to identify at least one workload that is associated with the increase, and the at least one workload is selected for movement to the third host 143. For example, if a determination is made that the workload, due to its serving of videos to a global audience, is the biggest contributor to the increase, the workload is selected to be moved. In another example, if a determination is made that a different workload, due to its support for a file sharing platform, is the biggest contributor to the increase, the different workload is selected to be moved.

In one embodiment, if a determination is made that in combination, the hosts of the data center 140 have threat scores exceeding a threshold overall threat score, a notification indicative of the determination is provided to a remediation engine.

Figure 7:
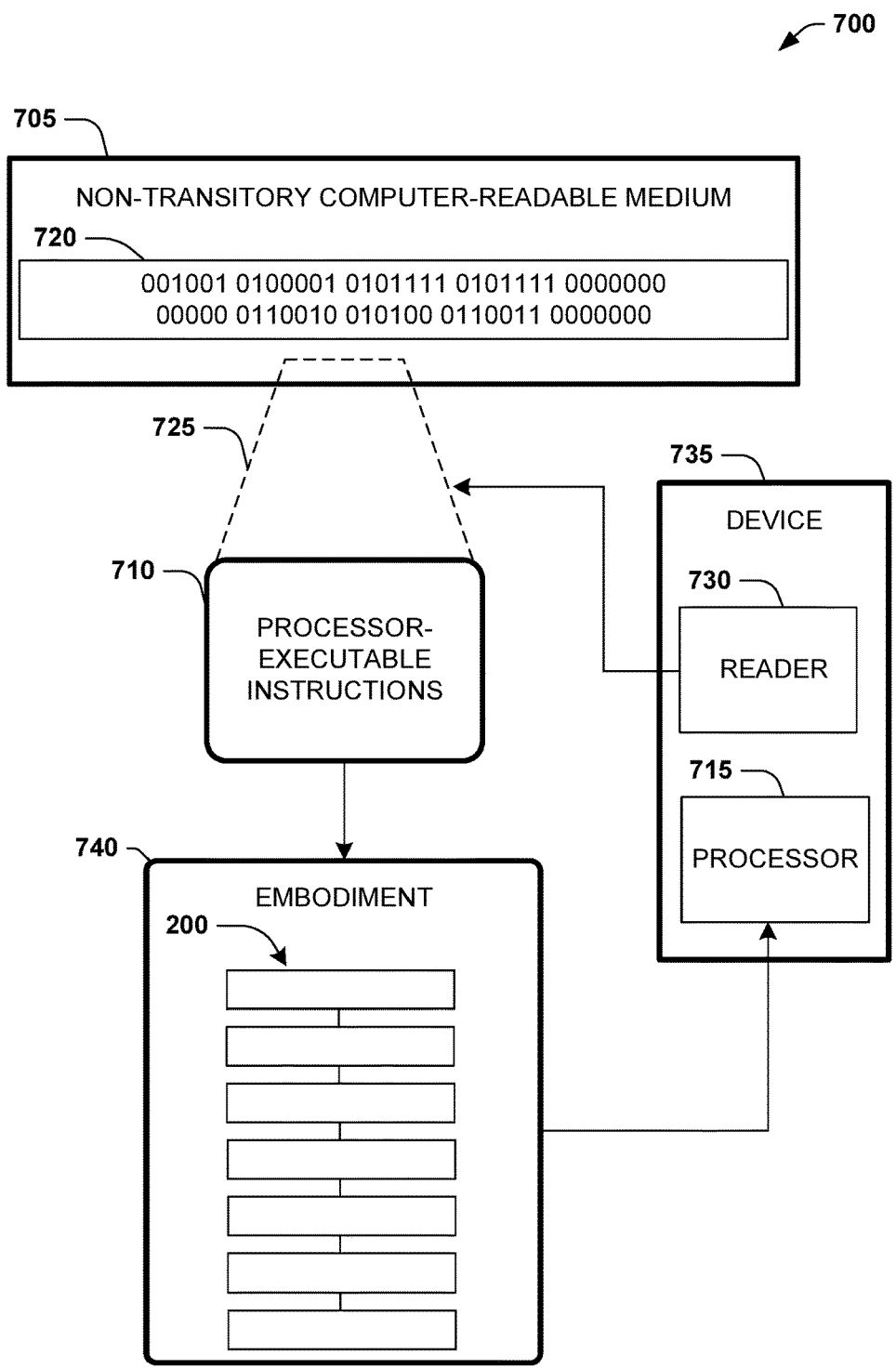
FIG. 7 illustrates an embodiment of a non-transitory computer-readable medium.

FIG. 7 is an illustration of a scenario 700 involving an example non-transitory computer-readable medium 705. In one embodiment, one or more of the components described herein are configured as program modules, such as the controller 105, stored in the non-transitory computer-readable medium 705. The program modules are configured with stored instructions, such as processor-executable instructions 710, that when executed by at least a processor, such as processor 715, cause the computing device to perform the corresponding function(s) as described herein. For example, functionality of the controller 105, stored in the non-transitory computer-readable medium 705, may be executed by the processor 715 as the processor-executable instructions 710 to perform an embodiment 740 of the method 200 of FIG. 2.

The non-transitory machine readable medium 705 includes the processor-executable instructions 710 that when executed by a processor 715 cause performance of at least some of the provisions herein. The non-transitory machine readable medium 705 includes a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 705 stores computer-readable data 720 that, when subjected to reading 725 by a reader 730 of a device 735 (e.g., a read head of a hard disk drive, or a read operation invoked on a solid-state storage device), express the processor-executable instructions 710. In some embodiments, the processor-executable instructions 710, when executed cause performance of operations, such as at least some of the example method 200 of FIG. 2, for example. In some embodiments, the processor-executable instructions 710 are configured to cause implementation of a system, such as at least some of the example system 100 of FIG. 1, for example.

Figure 8:
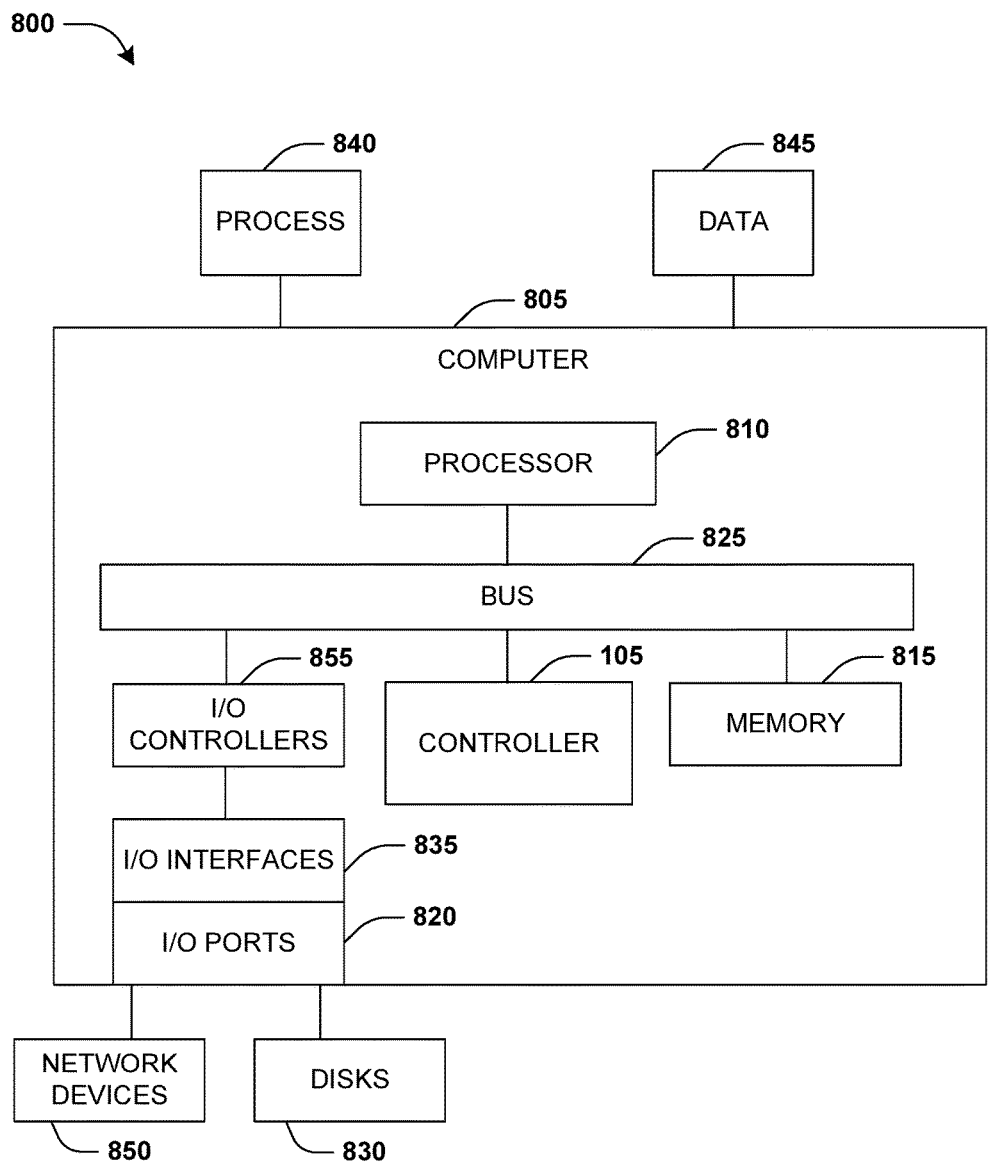
FIG. 8 illustrates an embodiment of a computing system configured with the example systems and/or methods disclosed.

FIG. 8 illustrates a scenario 800 of an example computing device that is configured and/or programmed with one or more of the example systems and methods described herein, and/or equivalents. The example computing device may be a computer 805 that includes a processor 810, a memory 815, and input/output ports 820 operably connected by a bus 825. In one example, the computer 805 may include logic of the controller 105 configured to facilitate the system 100 and/or the method 200 shown in FIGS. 1 and 2. In different examples, the logic of the controller 105 may be implemented in hardware, a non-transitory computer-readable medium 705 with stored instructions, firmware, and/or combinations thereof. While the logic of the controller 105 is illustrated as a hardware component attached to the bus 825, it is to be appreciated that in other embodiments, the logic of the controller 105 could be implemented in the processor 810, stored in memory 815, or stored in disk 830.

In one embodiment, logic of the controller 105 or the computer 805 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an application specific integrated circuit (ASIC) programmed to implement rule based source sequencing for allocation. The means may also be implemented as stored computer executable instructions that are presented to computer 805 as data 845 that are temporarily stored in memory 815 and then executed by processor 810.

The logic of the controller 105 may also provide means (e.g., hardware, non-transitory computer-readable medium 705 that stores executable instructions, firmware) for performing rule based source sequencing for allocation.

Generally describing an example configuration of the computer 805, the processor 810 may be a variety of various processors including dual microprocessor and other multi-processor architectures. The memory 815 may include volatile memory and/or non-volatile memory. Non-volatile memory may include, for example, read-only memory (ROM), programmable read-only memory (PROM), and so on. Volatile memory may include, for example, random access memory (RAM), static random-access memory (SRAM), dynamic random access memory (DRAM), and so on.

The disks 830 may be operably connected to the computer 805 via, for example, an input/output (I/O) interface (e.g., card, device) 835 and an input/output port 820. The disks 830 may be, for example, a magnetic disk drive, a solid state disk drive, a floppy disk drive, a tape drive, a Zip drive, a flash memory card, a memory stick, and so on. Furthermore, the disks 830 may be a CD-ROM drive, a CD-R drive, a CD-RW drive, a DVD ROM, and so on. The memory 815 can store a process 840 and/or a data 845, for example. The disk 830 and/or the memory 815 can store an operating system that controls and allocates resources of the computer 805.

The computer 805 may interact with input/output (I/O) devices via the I/O interfaces 835 and the input/output ports 820. Input/output devices may be, for example, a keyboard, a microphone, a pointing and selection device, cameras, video cards, displays, the disks 830, the network devices 850, and so on. The input/output ports 820 may include, for example, serial ports, parallel ports, and USB ports. I/O controllers 855 may connect the I/O interfaces 835 to the bus 825.

The computer 805 can operate in a network environment and thus may be connected to the network devices 850 via the I/O interfaces 835, and/or the I/O ports 820. Through the network devices 850, the computer 805 may interact with a network. Through the network, the computer 805 may be logically connected to remote computers. Networks with which the computer 805 may interact include, but are not limited to, a local area network (LAN), a new area network (WAN), and other networks.

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium storing computer-executable instructions that when executed by a processor of a computer cause the computer to:
   in response to receiving a request to place a virtual machine on one of a plurality of hosts, determine that the request is directed towards placing the virtual machine on a host meeting one or more resource requirements;
   analyze the plurality of hosts to identify a set of candidate hosts, comprising a first host and a second host, determined to meet the one or more resource requirements;
   analyze the first host to calculate a first threat score for the first host, wherein the calculating the first threat score comprises:
      calculating a first raw threat score for the first host;
      determining a first weight associated with a first cost associated with moving the virtual machine from the first host to a third host; and
      applying the first weight to the first raw threat score to calculate the first threat score;
   analyze the second host to calculate a second threat score for the second host, wherein the calculating the second threat score comprises:
      calculating a second raw threat score for the second host;

determining a second weight associated with a second cost associated with moving the virtual machine from the second host to the third host; and applying the second weight to the second raw threat score to calculate the second threat score;

compare the first threat score to the second threat score;

select a host with a lowest threat score from the set of candidate hosts, and place the virtual machine on the selected host;

reanalyze the selected host to calculate an updated threat score for the selected host based upon the placement of the virtual machine on the selected host; and in response to determining that the updated threat score exceeds a threshold threat score, move the virtual machine or one or more other virtual machines from the selected host to a fourth host.

2. The non-transitory computer-readable medium of claim 1, wherein the first threat score is calculated based upon one or more vulnerabilities of the first host, and the second threat score is calculated based upon one or more vulnerabilities of the second host.

3. The non-transitory computer-readable medium of claim 1, wherein the first cost is a first amount of resources or fees required to move the virtual machine from the first host to the third host, and the second cost is a second amount of resources or fees required to move the virtual machine from the second host to the third host.

4. The non-transitory computer-readable medium of claim 1, further storing computer-executable instructions that when executed by the processor cause the computer to:

determine the threshold threat score based upon at least one of one or more vulnerabilities or one or more security requirements associated with the virtual machine.

5. The non-transitory computer-readable medium of claim 1, wherein the computer-executable instructions to move the virtual machine or the one or more other virtual machines from the selected host to the fourth host further include computer-executable instructions that when executed by the processor cause the computer to:

predict a first cost associated with moving the virtual machine from the selected host to the fourth host;

predict a second cost associated with moving the one or more other virtual machines from the selected host to the fourth host; and select, for movement to the fourth host, the virtual machine or the one or more other virtual machines based upon a comparison of the first cost and the second cost.

6. The non-transitory computer-readable medium of claim 1, wherein the reanalyzing is performed in response to:

monitoring one or more actions performed by the virtual machine on the selected host.

7. The non-transitory computer-readable medium of claim 1, wherein the computer-executable instructions to move the virtual machine or the one or more other virtual machines from the selected host to the fourth host further include computer-executable instructions that when executed by the processor cause the computer to:

in response to determining that an increase from a threat score to the updated threat score is associated with at least one virtual machine on the selected host, select, for movement to the fourth host, the at least one virtual machine.

8. A computing system, comprising:

a processor connected to memory; and a placement module stored on a non-transitory computer readable medium and configured with instructions that when executed by the processor cause the processor to:

in response to receiving a request to place a software container on one of a plurality of hosts, determine that the request is directed towards placing the software container on a host meeting one or more resource requirements;

analyze the plurality of hosts to identify a set of candidate hosts, comprising a first host and a second host, determined to meet the one or more resource requirements;

analyze the first host to calculate a first threat score for the first host, wherein the calculating the first threat score comprises:

calculating a first raw threat score for the first host;

determining a first weight associated with a first cost associated with moving the software container from the first host to a third host; and applying the first weight to the first raw threat score to calculate the first threat score;

analyze the second host to calculate a second threat score for the second host, wherein the calculating the second threat score comprises:

calculating a second raw threat score for the second host;

determining a second weight associated with a second cost associated with moving the software container from the second host to the third host; and applying the second weight to the second raw threat score to calculate the second threat score;

compare the first threat score to the second threat score;

select a host with a lowest threat score from the set of candidate hosts, and place the software container on the selected host;

reanalyze the selected host to calculate an updated threat score for the selected host based upon the placement of the software container on the selected host; and in response to determining that the updated threat score exceeds a threshold threat score, move the software container or one or more other software containers from the selected host to a fourth host.

9. The computing system of claim 8, wherein the first threat score is calculated based upon one or more vulnerabilities of the first host, and the second threat score is calculated based upon one or more vulnerabilities of the second host.

10. The computing system of claim 8, wherein the first cost is a first amount of resources or fees required to move the software container from the first host to the third host, and the second cost is a second amount of resources or fees required to move the software container from the second host to the third host.

11. The computing system of claim 8, the non-transitory computer readable medium further configured with instructions that when executed by the processor cause the processor to:

determine the threshold threat score based upon at least one of one or more vulnerabilities or one or more security requirements associated with the software container.

12. The computing system of claim 8, wherein the instructions to move the software container or the one or more other software containers from the selected host to the fourth host further include instructions that when executed by the processor cause the processor to:
  predict a first cost associated with moving the software container from the selected host to the fourth host;
  predict a second cost associated with moving the one or more other software containers from the selected host to the fourth host; and
  select, for movement to the fourth host, the software container or the one or more other software containers based upon a comparison of the first cost and the second cost.

13. The computing system of claim 8, wherein the reanalyzing is performed in response to:
  monitoring one or more actions performed by the software container on the selected host.

14. The computing system of claim 8, wherein the instructions to move the software container or the one or more other software containers from the selected host to the fourth host further include instructions that when executed by the processor cause the processor to:
  in response to determining that an increase from a threat score to the updated threat score is associated with at least one software container on the selected host, select, for movement to the fourth host, the at least one software container.

15. A computer-implemented method performed by a computing device comprising a processor, the computer-implemented method comprising:
  in response to receiving a request to place a workload on one of a plurality of hosts, determining, by at least the processor, that the request is directed towards placing the workload on a host meeting one or more resource requirements;
  analyzing, by at least the processor, the plurality of hosts to identify a set of candidate hosts, comprising a first host and a second host, determined to meet the one or more resource requirements;
  analyzing, by at least the processor, the first host to calculate a first threat score for the first host, wherein the calculating the first threat score comprises:
    calculating a first raw threat score for the first host;
    determining a first weight associated with a first cost associated with moving the workload from the first host to a third host; and
    applying the first weight to the first raw threat score to calculate the first threat score;
  analyzing, by at least the processor, the second host to calculate a second threat score for the second host, wherein the calculating the second threat score comprises:
    calculating a second raw threat score for the second host;
    determining a second weight associated with a second cost associated with moving the workload from the second host to the third host; and
    applying the second weight to the second raw threat score to calculate the second threat score;
  comparing the first threat score to the second threat score;
  selecting, by at least the processor, a host with a lowest threat score from the set of candidate hosts, and placing the workload on the selected host;
  reanalyzing, by at least the processor, the selected host to calculate an updated threat score for the selected host based upon the placement of the workload on the selected host; and
  in response to determining that the updated threat score exceeds a threshold threat score, moving, by at least the processor, the workload or one or more other workloads from the selected host to a fourth host.

16. The computer-implemented method of claim 15, wherein the first threat score is calculated based upon one or more vulnerabilities of the first host, and the second threat score is calculated based upon one or more vulnerabilities of the second host.

17. The computer-implemented method of claim 15, wherein the first cost is a first amount of resources or fees required to move the workload from the first host to the third host, and the second cost is a second amount of resources or fees required to move the workload from the second host to the third host.

18. The computer-implemented method of claim 15, further comprising:
  determining the threshold threat score based upon at least one of one or more vulnerabilities or one or more security requirements associated with the workload.

19. The computer-implemented method of claim 15, wherein the moving the workload or the one or more other workloads from the selected host to the fourth host further comprises:
  predicting a first cost associated with moving the workload from the selected host to the fourth host;
  predicting a second cost associated with moving the one or more other workloads from the selected host to the fourth host; and
  selecting, for movement to the fourth host, the workload or the one or more other workloads based upon a comparison of the first cost and the second cost.

20. The computer-implemented method of claim 15, wherein the moving the workload or the one or more other workloads from the selected host to the fourth host further comprises: in response to determining that an increase from a threat score to the updated threat score is associated with at least one workload on the selected host, selecting, for movement to the fourth host, the at least one workload.

* * * * *